US010962754B2

(12) United States Patent
Reyes Fuchs

(10) Patent No.: US 10,962,754 B2
(45) Date of Patent: Mar. 30, 2021

(54) METHOD FOR FORMING A COLOUR IMAGE OF INCINERATED MATERIALS USING MICROSCOPY TECHNIQUES

(71) Applicant: Carmen Gabriela Reyes Fuchs, Mexico City (MX)

(72) Inventor: Carmen Gabriela Reyes Fuchs, Mexico City (MX)

( * ) Notice: Subject to any disclaimer, the term of this patent is extended or adjusted under 35 U.S.C. 154(b) by 0 days.

(21) Appl. No.: 16/628,380

(22) PCT Filed: Apr. 10, 2018

(86) PCT No.: PCT/MX2018/000038
§ 371 (c)(1),
(2) Date: Jan. 3, 2020

(87) PCT Pub. No.: WO2019/009691
PCT Pub. Date: Jan. 10, 2019

(65) Prior Publication Data
US 2020/0150411 A1    May 14, 2020

(30) Foreign Application Priority Data

Jul. 5, 2017    (MX) .................... MX/a/2017/008919

(51) Int. Cl.
*G02B 21/16* (2006.01)
*G01N 21/31* (2006.01)
(Continued)

(52) U.S. Cl.
CPC ............. *G02B 21/16* (2013.01); *G01N 21/31* (2013.01); *G01N 21/64* (2013.01); *G02B 21/34* (2013.01); *G02B 21/02* (2013.01)

(58) Field of Classification Search
None
See application file for complete search history.

(56) References Cited

U.S. PATENT DOCUMENTS 6,291,144 B1 * 9/2001 Aylward .............. G03C 7/3029
430/359
7,764,361 B2 * 7/2010 Kelso ................. G01N 21/6428
356/73
(Continued)

FOREIGN PATENT DOCUMENTS

UA          81321      12/2007
WO    WO2011091031    7/2011

OTHER PUBLICATIONS

Ormachea, O. & Villazon, A: "Desarollo de un microscopio de epifluorescencia de bajo costa". Investigacion & Desarrollo, Jun. 10, 2017, vol. 1, No. 17, pp. 5-14, ISSN 2518-4431.

*Primary Examiner* — Reza Aghevli
(74) *Attorney, Agent, or Firm* — Defillo & Associates, Inc; Evelyn A. Defillo

(57) ABSTRACT

The present invention relates to a process for forming, by using a microscope, a color image of materials incinerated by microscopy techniques, which advantageously allows to show the behavior of the ashes after the incineration of living beings, as well as their different variations, with which it can be determined that each and every one of the living beings have a load on the trace elements and in different composition, shown by different shapes, lights, colors and textures. This process finds application in various methods for the correct cataloging and differentiation of elements and compounds of each sample, in forensic studies of each living being, as well as in paleontological, archaeological, forensic geo-science, forensic anthropology, forensic medicine, psychological, tanatology offering a different alternative to understand in a standardized way the composition of the ashes from the cremation process, as well as the visualization of photographs and/or videos taken by a camera connected to the microscope.

7 Claims, 2 Drawing Sheets

(51) Int. Cl.
 *G01N 21/64* (2006.01)
 *G02B 21/34* (2006.01)
 *G02B 21/02* (2006.01)

(56) References Cited

U.S. PATENT DOCUMENTS

| | | | | |
|---|---|---|---|---|
| 8,398,263 | B2* | 3/2013 | Tafas | G02B 21/06 |
| | | | | 362/232 |
| 8,468,670 | B2* | 6/2013 | Baigorri Hermoso | B21J 15/14 |
| | | | | 29/243.53 |
| 10,545,075 | B2* | 1/2020 | Deisseroth | G01N 27/44747 |
| 2001/0055764 | A1* | 12/2001 | Empedocles | G01N 33/54346 |
| | | | | 435/6.11 |
| 2007/0152177 | A1* | 7/2007 | Nichols | H01H 1/0015 |
| | | | | 250/504 R |
| 2008/0145857 | A1* | 6/2008 | Saito | B01L 3/502715 |
| | | | | 435/6.11 |
| 2008/0246968 | A1* | 10/2008 | Kelso | G01N 21/6428 |
| | | | | 356/417 |
| 2009/0007401 | A1 | 1/2009 | Bills | |
| 2009/0007410 | A1* | 1/2009 | Baigorri Hermoso | |
| | | | | B21J 15/142 |
| | | | | 29/524.1 |
| 2010/0068747 | A1* | 3/2010 | Herrenknecht | G01N 33/5035 |
| | | | | 435/29 |
| 2011/0204135 | A1 | 8/2011 | Hershenhorn | |
| 2011/0242502 | A1* | 10/2011 | Shibasaki | G03B 21/204 |
| | | | | 353/84 |
| 2011/0280013 | A1* | 11/2011 | Tafas | G02B 21/06 |
| | | | | 362/232 |
| 2012/0270162 | A1* | 10/2012 | Dahlhielm | F23N 1/002 |
| | | | | 431/12 |
| 2015/0144490 | A1* | 5/2015 | Deisseroth | G01N 33/4833 |
| | | | | 204/461 |
| 2015/0185456 | A1* | 7/2015 | Kishima | G02B 21/008 |
| | | | | 348/80 |
| 2017/0219465 | A1* | 8/2017 | Deisseroth | G02B 21/34 |
| 2018/0157019 | A1* | 6/2018 | Kroeger-Lui | G02B 21/06 |

* cited by examiner

METHOD FOR FORMING A COLOUR IMAGE OF INCINERATED MATERIALS USING MICROSCOPY TECHNIQUES

CROSS REFERENCE TO RELATED APPLICATION

This application is a national stage entry of PCT/MX2018/000038 filed Apr. 10, 2018, under the International Convention and claiming priority over Mexican Patent Application No. MX/a/2017/008919 filed Jul. 5, 2017.

TECHNICAL FIELD

The present invention belongs to the technical field of optics. Particularly to the technical field of the analysis of materials by modification of their physical or chemical properties and more specifically it refers to a process to form a color image of materials incinerated by microscopy and photography techniques.

BACKGROUND

At present there is an increasingly recurring practice of incinerating bodies either by religious beliefs or by the simplified that this practice could be for the rest of our loved ones or simply for the optimization of space. During the passage of time, as well as the various discoveries and investigations, it has been detected that the ashes are the result of an incineration procedure, common within human religious practices, as well as of things, living beings, inert, objects, etc., due to the beliefs of the different religions and civilizations of the world and our history in it. The evaluation of human remains is considered in some countries and for certain communities and taboo people, this being possibly the reason why a thorough and determined investigation has not been carried out by means of different devices or processes, or, as in In the present case, the study using the microscope (understanding the various types), to determine the composition of the ashes.

The elements that make up the ash samples derived from a cremation are the same, only in different quantities and percentages. What generates these differences may be due to the ecosystem, food, geography and even the air or environment, where each living being develops, the method of spraying and incineration in addition to the different compounds and materials that make up the Coffin are also causing the differences, denoting the difference between the subject matter. (In case the coffin is cremated at the same time).

This causes, in the first place, the carbonization (total or partial) and ultimately, the incineration (total or partial) of the different tissues, including skeletal or bone. It is clear that both possibilities appear simultaneously in those cases where cremation is not completed in a homogeneous way, therefore, we mean by cremation simply the act of burning the body at high temperatures, or its cadaveric remains, regardless of result achieved. The use of these terms referring to the external habit of the corpse, charred or incinerated, only described the general or predominant aspect of the result of the fire on the body, demonstrating that all living beings at the time of death and after being incinerated present different types of formations, crystallization, morphology and fluorescence at the time of being incinerated and later at the time of being observed through a microscope, an indispensable method for the observance of various ashes after the incineration process in living beings.

In this sense, there is a need to differentiate or classify the ashes of any cremated living being, as well as to observe the natural behavior of various ashes belonging to living beings, which demonstrates that all living beings have different types of crystallization, morphology and fluorescence in the ashes after the cremation or cremation process.

Therefore, it is desirable to have processes that can obtain information from the incinerated materials, specifically ashes derived from a cremation of an animal subject, not limited to a human subject to determine the differentiation in the composition of each, which finds application in various methods for the correct cataloging and differentiation of elements and compounds of each sample in the forensic studies of each living being, as well as in paleontological, archaeological, scientific geoscience, forensic anthropology, forensic, psychological medicine, tanatology research processes. However, during a thorough search to determine the state of the art of the present invention, no document is found that allows establishing any proximity to a process aimed at providing a solution to the previous approach.

SUMMARY OF THE INVENTION

In accordance with the foregoing, a protection object of the present invention refers to a process or methodology for forming a color image of incinerated materials, characterized in that it comprises the following steps:

i. deposit a sample of incinerated material on a support medium to be observed under a microscope;

ii. making observations through said microscope with the epifluorescence method, that is to say by reflection with a two-band Ploem prism (with a wavelength of 470 nm Interference Blue Filter at 490 nm U-MNB BP and DM 500, BA 515);

1ii. and an excitation or emission filter or cube that allows an excitation of 330 nm wavelength and an emission of 385 nm within the so-called U that refers to Ultraviolet; a narrow band excitation filter or hub called.

A second protection object refers to an image formed according to the process described above, which shows a color incinerated material on a photographic or video medium.

The objectives of the present invention referred to above and still others not mentioned, will be evident from the description of the invention and the figures that accompany it by way of illustration and not limitation, which are presented below.

DESCRIPTION OF THE INVENTION

Figure 1:
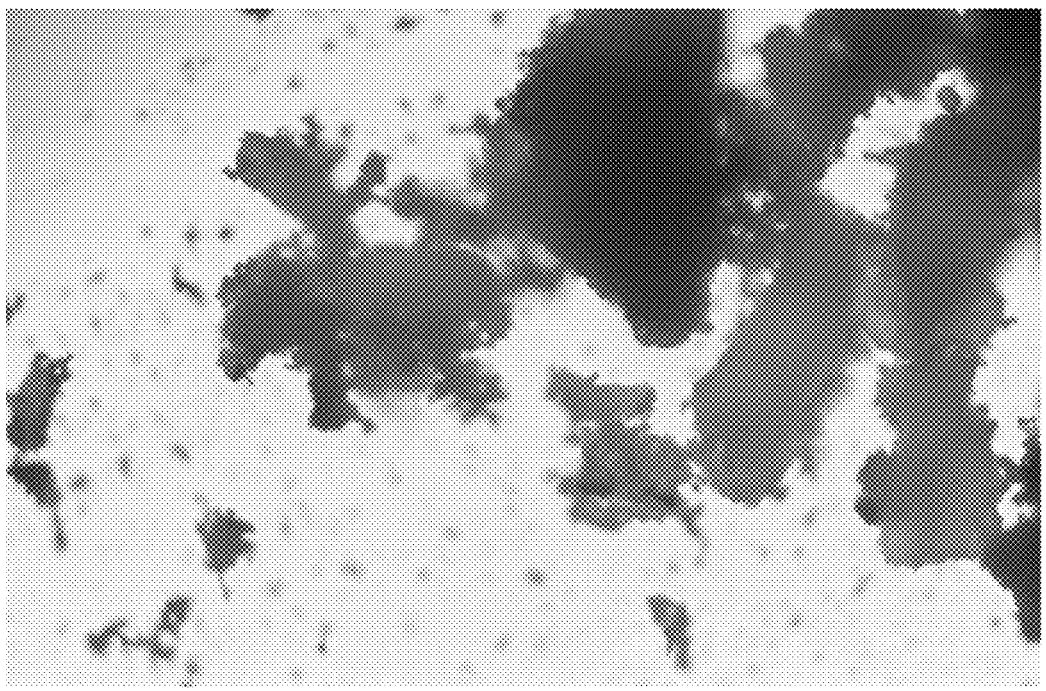
FIG. 1 is an image obtained with light field microscopy techniques, where a 20× objective was used.

The present invention relates to a process for forming a color image of materials incinerated by microscopy techniques, which integrates a set of steps, which together show the behavior of the ashes after the incineration of living beings, as well as their different variations, confirming that each and every mammal and reptile, after its death and after cremation when viewed under a microscope, have different shapes, colors and textures, and therefore, the images observed through the microscope in question, with respect to these ashes they would denote a considerable difference.

This process can be implemented and applied to science, such as forensics and archeology, by virtue of the fact that both use remains of living beings in order to confirm theories. Likewise, the present process details, through visual evidence, such as photographs and/or video recordings, the unique textures, colors and images that contain the ashes by means of a unique process, which could be considered as art and to be able to make exhibitions about it and Your marketing The present process begins after the incineration of a living being, preferably a human subject, where the ashes resulting from the incineration are observed under a microscope; later it can be observed that the images show peculiarities, such as luminescences never before detected (fluorescence) in the ashes of a human being, where conventional or traditional techniques only allow black and white images to be obtained. The images or video recordings represented the natural beauty with which the ashes of a human being count after being incinerated, this beauty is summed up to textures, borders, colors, luminescence, fluorescence, measurements, even when these ashes are made of tissue mineralized and calcium phosphate within other minerals such as coal and other basic elements.

The fact that in humans a homogeneity of elements according to their diet and lifestyle of each one has not been demonstrated, has a direct influence on the cremated human remains, factors to be considered as the local geology, which plays a important role in determining the loads of trace elements, as an example, that of individuals living in industrialized nations and is possibly the main factor for people living in pre-industrialized nations or in isolated rural areas. Therefore, significant variations in the diet should have a noticeable impact on the burden of trace elements of an individual after incineration.

The results obtained with the process of the present invention, are new in the field in which they are developed, so far no different epifluorescence microscopes have been used, which if done should refer to the transmission curve and wavelength diagrams of the different producers of microscopes to observe the different fluorescence concept of the present, textures, colors and shapes of the ashes product of the incineration of living beings (refers in this document to be alive to mammals and reptiles), as well as characteristics that they differentiate each one from the other, fluorescence that can only be observed through said microscopic process, taking into account that to date there is no detailed history of the study of fluorescence or morphology of the ashes in question, through the process that is explained in this report, which corresponds to the observation of the ashes through a microscope.

The fluorescence, colors, shapes, among others, in the images or videos of said ashes when they are observed in the microscope, are produced as a result of a natural effect, which is generated or reacted by natural excitation of the materials. It is possible to obtain a wide variety of colors and fluorescence, depending on the wavelength emitted by the fluorescent compound, variations of luminescent colors are detected when viewed through the microscope, as well as the connection of a camera to it, which is essential to capture or document the results obtained. The selection of a filter band of broadband, super wide or narrow depends on the condition of the sample and the purpose of its observation, the combination of said cubes is defined according to what you want to observe.

In order to obtain a suitable image by using the microscope, it is appropriate to consider the preparation of slides, that is, slides and coverslips, as well as the implementation of a microscope, in which the light affects the preparation and passes through the lenses of the objective, which results in a detailed image.

The behavior and natural analysis of the ashes, at the time of being observed through the microscope with the selection of filters suitable for obtaining the result reason for the present, as well as different lenses with magnification variation, shows that each and every one of the living beings, we have different charges and counts in the composition, in fluorescence and morphology of the ashes at the time of being incinerated, these elements differ, which could be verified with the observation of a considerable amount of different samples of ashes of beings humans and animals specifically.

The ashes are observed through a microscope with various optical systems such as: clear field, with the function of fluorescence microscopy that must have two types of dichroic prisms Ploem type and WU light to obtain the desired results. Said microscope has two dichroic or interferential filters to reflect the light to be filtered, in this way it is possible to separate the light into two chromatic beams; In addition, an excitation filter is used in combination to select the excitation wavelength, that is, the spectral properties to be observed. The process comprises the step of combining a two-band FITC filter (with a wavelength of 490 nm to 520 nm with applicable excitation filter of IB (Interference Blue Filter) and a filter or excitation or emission cube that allows a length excitation 372 nm wave and a 456 nm emission within the so-called U that refers to Ultraviolet, a narrow band excitation filter or cube called U-MNB (BP 470 nm-490 nm, DM 500, BA 515).

The fact that, in the ashes of living beings, which is possible to visualize through the microscope, the color or observable colors also vary depending on the variation of the wavelength, as well as the ashes of each being.

The process or procedure continues when a camera is connected to a research microscope, which is integrated by means of image capture in order to visualize them.

In a preferred embodiment of the invention, the microscope to be used must have the following specifications in order to visualize the ashes: FL 4×, 10×, 20× and 40× objective, U-MWU fluorescence cube, a U-MNB narrowband cube, in the case of using another brand of microscope, it will be necessary to refer to the diagram of transmission curves and wavelengths to match those used, this because each brand has its method of measuring and naming the filters.

The ash samples are placed between the lamellae (slides and coverslips), then the slide is sealed on its lateral sides with the coverslip with a mixture of beeswax and paraffin, this in order to avoid the dispersion of the ashes, and which is a material which, derived from its low weight, can spread; and placed in the microscope for observation.

As a first step, observations are made through said microscope, with the method called epifluorescence, by reflection and fluorescence with a narrow band excitation cube (BP 470-490 nm, DM 500 nm, BA515) and a band excitation cube Wide called U-MWU (BP 330-385 nm, DM 400 nm, BA 420), observations were made of the ashes with 4×, 10×, 20× and 40× objectives, where photographic records are made, as well as moving image in High and low definition.

The second step consists of visually analyzing the different ash samples visually in the microscope, identifying the differences that exist between the samples, or those that belonged to different living beings, these differences could be in images, or in colors, the above Due to the differences in the thicknesses, sizes, pulverization of the sample material, the elements that make up the samples and the materials that make up the bone material and soft tissue calcined of living beings, of which the present process gives us the opportunity to identify and differentiate, because this is an innovative method or process.

It should be noted that, at the time of the observation of the ashes in the microscope, the space where this is carried out, would have to have sanitization with the purpose of not altering the ashes observed with elements not coming from them, which may confuse through the microscope used in the present process.

In this invention microscopy techniques were used.

First, the microscope used has different functions; bright field, phase contrast, polarized light, orthoscopy, differential interference contrast.

Florescence microscopy was used with two types of dichroic prisms Ploem type with a narrow band excitation cube (BP 470-490 nm, DM500 nm, BA515) and a broad-band excitation cube called U-MWU (BP 330-385 nm, DM 400 nm, BA 420) observations were made of the ashes with 4×, 10×, 20× and 40× objectives. The latter makes a difference and is the cause of the present invention.

The present process described below comprises the following steps:

Preparation of lamellae:

i) Place a sample of at least 1 mg of ashes on a slide, and place a coverslip preferably 0.17 mm thick; seal the outline of said coverslip with a mixture of beeswax and paraffin to prevent dispersion;

Dry ashes were used, no mounting medium or liquid was added.

ii) Perform visual observations in fluorescence microscopy by reflection, epifluorescence, with U-MWU and U-MNB filters, the qualities of these filters have been described previously (The names of the cubes and nanometer numbers refer to the Olympus U-cubes URA used in this case, does not exclude other marks and refers to the band and wavelength of a beam of light.)

iii) Perform visual observation under the microscope with a filter with NB designation of excitation and transmission at 470 nm and 490 nm respectively with any of the objectives of 4×, 10×, 20× and 40×.

Once the image is obtained, it can be documented by connecting a camera or video camera to the microscope.

The present invention describes the steps and methods to be followed for the analysis by means of a microscope of said ashes, since in these different luminescences, shapes, compositions, figures, colors and textures can be appreciated, which could be photographed and recorded video, taking into account that the ashes of any living being because of its compositions, ground and sizes are different from each other.

BEST METHOD FOR CARRYING OUT THE INVENTION

The present examples are illustrative and not limiting, since a person skilled in the art will understand that there are variants that fall within the scope of protection of the present invention.

Example 1. The first tests were carried out with a light field microscope, in the results obtained light background images with dark areas corresponding to the ash particles are detected. FIG. 1 shows an image where a polarizing filter was used in light field microscopy from human remains of a 60-year-old individual whose cause of death was metastatic cancer. A 20× objective was used, this sample serves as an example to compare the results of the reason method of the present application with previous methods used, denoting the difference between one process and the other. The image was taken with a Nikon D800 camera in RAW format. As you can see the ashes are basically composed of minerals and coal, and the light-field microscope image only allows dark tones to be appreciated.

Figure 2:
FIG. 2 shows an image showing fluorescence with fluorescence microscopy techniques with the process of the present invention, where a 40× objective was used.
Figure 3:
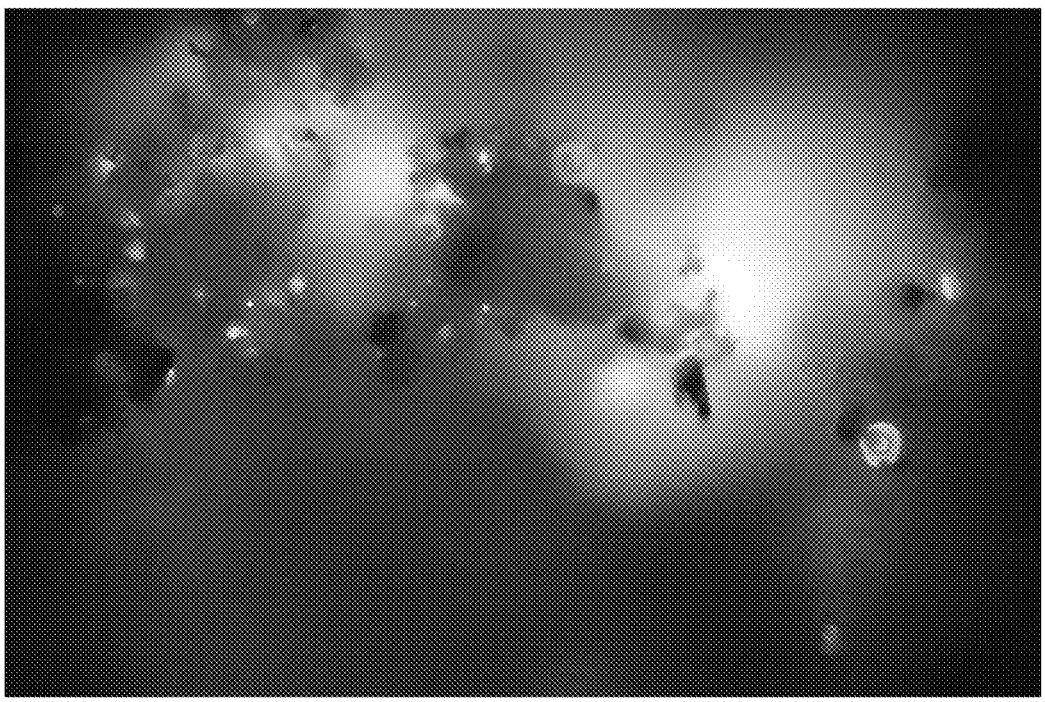
FIG. 3 shows an image showing fluorescence with fluorescence microscopy techniques with the process of the present invention, where a 20× objective was used.

Example 2. The images observed in FIGS. 2 and 3 are the result of the formation when applying the process described in the description, in particular FIG. 2 is an image that shows fluorescence using fluorescence microscopy techniques with the certain filters described in the process of said request from human remains of a 60-year-old individual, cause of death; metastatic cancer A 40× objective was used, in this sample the predominant colors are the blue ones, that is to say that it has a band pass of 450 nm to 500 nm almost no other colors were found, except for a red of equal intensity to the one shown here. The image was taken with a Nikon D800 camera in RAW format. For its part, FIG. 3 is an image that shows fluorescence using fluorescence microscopy techniques with the certain filters described in the process of the present application, from human remains of a 60-year-old individual, cause of death; Myeloid leukemia A 20× objective was used, in this sample the color spectrum has a range from warm to cold colors, that is from 330 nm to 700 nm with different intensities depending on the wavelength as shown here. The image was taken with a Nikon D800 camera in RAW format.

Figure 4:
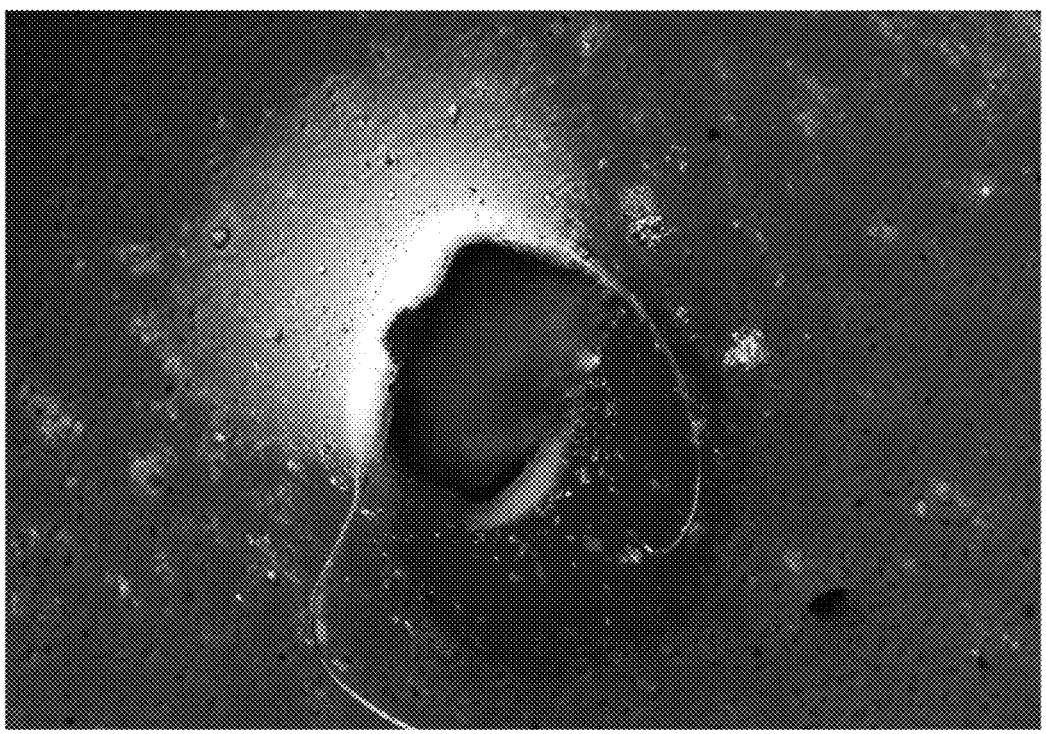
FIG. 4 is an image where a polarizing filter was used.

Example 3. FIG. 4 is an image where a polarizing filter generally composed of human remains of an 80-year-old individual causing death was used; Natural death. This light produces light or dark in the microscope field, depending on whether the two nicoles are parallel or crossed, allowing to observe a single plane.

It was observed that all human beings are therefore composed of the total load of trace elements of any individual that is the sum of a variety of exposures throughout his life. That is why at the time of incinerating a living being, and observing its ashes in a microscope, it shows us different behaviors of excitation, morphology and so on of the matter in question, since the living beings have different types of elements and compounds, which makes us unique, in addition to the elements and compounds from wood, enamels, metals and other materials belonging to the coffins and boxes where the corpse is placed for incineration, if this is the case.

The use of this process in forensic science, in anthropology, as a funeral service, in art and in tanatology, would lead to an improvement in the research method, or a different alternative to detect truths within this material, as well as the visualization of photographs or videos taken by the camera connected to the microscope, object of the present process, in order to appreciate the beauty derived from a microscopic image of ashes of living beings, likewise the present Process would serve to understand in a standardized way the composition of the ashes from the cremation process.

The diverse use that could be given to the present process, confirms that it could be applied to science, humanities, social sciences, business processes and generator of economies, as well as to art, because it is a matter from the incineration of living beings, which after being visualized in a microscope, as well as with lighting variations, projects images and different behaviors in their structure, colors, luminescence, textures etc.

There are several images protected by the Federal Copyright Law, which would be an integral part of the present process patent application, because they show in a more graphic way, what is observed when implementing this Patent process, which as you can see describe in a better way the structure and composition of the ashes when they are observed and/or video recorded through a microscope.

It is important to note that unlike what many believed when observing ashes in a microscope, they have colors and fluorescence, which are given by observation using the process of the present invention.

Although the above description was made taking into account the preferred modalities of the invention, it should be taken into account by those skilled in the field, that any modification of form and detail will fall within the spirit and scope of the present invention. The terms in which this report has been written must always be taken in a broad and non-limiting sense. The materials, form and description of the elements, will be susceptible of variation as long as this does not imply an alteration of the essential characteristic of the model.

The invention claimed is:

1. A process for forming by using a microscope for a color image of incinerated materials, the method comprising the steps of:
   providing a bright field microscope having a function of fluorescence microscopy, two dichroic filters, a two-band filter of a wavelength of 490 nm to 520 nm, and an excitation filter having an excitation length of 372 nm to 456 nm wavelength;
   drying a predetermined amount of ashes sample;
   placing dried ashes sample on a slide, the dried ashes sample is covered with a coverslip, placing the covered dried ashes sample on a microscope;
   reflecting the light to be filtered through the two dichroic filters of the microscope to separate the light into two chromatic beams;
   selecting an excitation wavelength using the excitation filter to determine spectral properties of the dried ashes sample;
   combining the two-band filter with an interference blue filter and the excitation filter within the ultraviolet spectrum;
   observing through a camera, connected to the microscope, the color image of the dried ashes sample.

2. The process according to claim 1, further including after covering the slide with the coverslip, the step of sealing slides of the coverslip and the slide with a mixture of beeswax and paraffin.

3. The process according to claim 1, further including the step of documenting the image recorded by the camera.

4. The process according to claim 1, wherein the observations are made with 4×, 10×, 20×, and 40× objectives.

5. An image formed in accordance with the process of claim 1, wherein the image shows a color image of the ash material on a photographic or video medium.

6. The process according to claim 1, wherein the ashes sample contains human ashes.

7. The image according to claim 5, wherein the ashes material contains human ashes.

* * * * *